United States Patent
Anerousis et al.

(10) Patent No.: US 9,426,030 B1
(45) Date of Patent: Aug. 23, 2016

(54) AUTOMATICALLY GENERATING CONFIGURATION IMAGES AND DEPLOYING COMPUTER COMPONENTS IN A COMPUTING ENVIRONMENT THAT COMPRISES A SHARED POOL OF CONFIGURABLE COMPUTING RESOURCES

(71) Applicant: International Business Machines Corporation, Armonk, NY (US)

(72) Inventors: Nikolaos Anerousis, Chappaqua, NY (US); Jinho Hwang, Ossining, NY (US); Brian L. Peterson, Ridgefield, CT (US); John J. Rofrano, Mahopac, NY (US)

(73) Assignee: International Business Machines Coporation, Armonk, NY (US)

( * ) Notice: Subject to any disclaimer, the term of this patent is extended or adjusted under 35 U.S.C. 154(b) by 0 days.

(21) Appl. No.: 14/966,864

(22) Filed: Dec. 11, 2015

(51) Int. Cl.
*H04L 12/24* (2006.01)

(52) U.S. Cl.
CPC ............ *H04L 41/0843* (2013.01); *H04L 41/08* (2013.01); *H04L 41/0803* (2013.01); *H04L 41/084* (2013.01); *H04L 41/0859* (2013.01); *H04L 41/0876* (2013.01); *H04L 41/0886* (2013.01)

(58) Field of Classification Search
CPC ... H04L 41/08; H04L 41/0803; H04L 41/084; H04L 41/0843; H04L 41/0859; H04L 41/0876; H04L 41/0886; H04L 63/02; G06Q 30/062; G06Q 10/06; G06F 8/72; G06F 8/71; G06F 8/00; G05B 15/02
See application file for complete search history.

(56) References Cited

U.S. PATENT DOCUMENTS

| | | | |
|---|---|---|---|
| 6,252,858 B1 * | 6/2001 | Inoue | H04L 41/0843 370/254 |
| 6,944,759 B1 | 9/2005 | Crisan | |
| 8,875,118 B1 * | 10/2014 | Groothius | G06F 8/71 717/168 |

(Continued)

FOREIGN PATENT DOCUMENTS

| EP | 0632371 A1 | 1/1995 |
|---|---|---|
| WO | 2010030439 A1 | 3/2010 |

OTHER PUBLICATIONS

IBM, "A System to Generate Business Process Template Using Extended Sequential Pattern Mining", An IP.com Prior Art Database Technical Disclosure, Jan. 5, 2007, 9 pages.

(Continued)

*Primary Examiner* — Le H Luu
(74) *Attorney, Agent, or Firm* — Scully, Scott, Murphy & Presser, P.C.; Louis J. Percello, Esq.

(57) ABSTRACT

Generating configuration images and deploying computer components in a computing environment that comprises a shared pool of configurable computing resources may be provided. Configuration templates from a plurality of repositories may be mined and classified. Base templates may be created that represent different service configurations based on the configuration templates classified into classes of different service configurations. For deploying a requested service with specified requirements, a plurality of candidate templates may be created based on the base templates that represent configurations for the requested service and configurations that meet the specified requirements. A target template from the plurality of candidate templates may be selected that most meets the specified requirements. Computer resources for the requested service may be deployed by running the target template.

20 Claims, 5 Drawing Sheets

(56) References Cited

U.S. PATENT DOCUMENTS

| | | | |
|---|---|---|---|
| 2003/0236576 A1* | 12/2003 | Resnick | G05B 15/02 700/9 |
| 2007/0198665 A1* | 8/2007 | De Matteis | H04L 41/0843 709/220 |
| 2009/0171705 A1* | 7/2009 | Bobak | G06Q 10/06 705/80 |
| 2011/0173302 A1 | 7/2011 | Rider | |
| 2011/0296391 A1* | 12/2011 | Gass | G06F 8/72 717/168 |
| 2013/0138812 A1 | 5/2013 | Assuncao et al. | |
| 2014/0012856 A1* | 1/2014 | Abdelrahman | G06Q 30/0621 707/740 |
| 2015/0128103 A1* | 5/2015 | Stratton | G06F 8/00 717/100 |
| 2015/0281285 A1* | 10/2015 | Bharali | H04L 63/02 726/1 |
| 2016/0050116 A1* | 2/2016 | Sheshadri | H04L 41/0843 709/221 |

OTHER PUBLICATIONS

Anonymous, "A Cloud Based Session Method for Efficient Technical Support", Dec. 5, 2013, An IP.com Prior Art Database Technical Disclosure, 13 pages.

* cited by examiner

```
FROM centos:centos6
# Enable EPEL for Node.js

RUN rpm-Uvh
    http://download.fedoraproject.org/pub/
    epel/6/i386/epel-release-6-8.noarch.rpm

# Install Node.js and npm
RUN yum install -y npm # Bundle app
source COPY ./src

# Install app dependencies
RUN cd /src; npm install EXPOSE 8080
CMD ["node" , "/src/index.js"]
```

FIG. 3A

```
# includes nodejs default attributes first to override
them
include_attribute 'nodejs' defines node.js and npm version configuration
default.nodejs.version = '0.10.0' default.nodejs.npm=
'1.2.14' defines npm packages to install globally
default.marinara.application.npm_packages = {'grunt-
cli' => '0.1.6' , 'bower' => '0.8.5' } provisions node.js and npm include_recipe
'nodejs::install _from_source' include_recipe
'nodejs::npm provisions global npm packages
node.marinara.application.npm_packages.each_pair do
| pkg, ver |
  npm_package pkg do
    version ver
  end
end
```

FIG. 3B

```
# We stay with centos6 now, centos7 is next on the list
FROM centos:centos6

# This custom repo file just activate "centos-plus" repo otherwise you will get error with selinux dependencies
ADD CentOS-Base.repo /etc/yum.repos.d/CentOS.Base.repo

# Update the base system with latest patches
RUN yum -y update && yum clean all

# Prepare the ground use software collections
RUN yum -y install scl-utils && yum clean all # Install nginx
RUN rpm -I https://www.softwarecollections.org/en/scls/rhscl/nginx14/epel-6-x86_64/download/rhscl-
nginx14-epel-6-x86_64-1-2.noarch.rpm
RUN yum-y install nginx14-nginx && yum clean all

# Configure nginx
ADD docker-web/nginx.conf /opt/rh/nginx14/root/etc/nginx/nginx.conf

# Deploy the static assets
ADD . var/www/
EXPOSE 80

# Launch nginx at start
CMD ["/opt/rh/nginx14/root/sbin/nginx"]

# Add Tivoli Endpoint Client
RUN rpm -I https://www.corp.com/en/software/product_endpoint_x86_64_5-6.rpm
RUN yum -y install product_endpoint && yum clean all

# Configure Tivoli Endpoint Manager
ADD /opt/product/endpoint.conf
```

ADDITIONAL MONITORING FEATURE WITH MINIMUM RISK IMPACT

FIG. 4

AUTOMATICALLY GENERATING CONFIGURATION IMAGES AND DEPLOYING COMPUTER COMPONENTS IN A COMPUTING ENVIRONMENT THAT COMPRISES A SHARED POOL OF CONFIGURABLE COMPUTING RESOURCES

FIELD

The present application relates generally to computers and computer applications, and more particularly to computing environment with shared pool of configurable computing resources and configuring deployment of computing resources in the computing environment.

BACKGROUND

In a computing environment utilizing a shared pool of configurable computing resource, also referred to as a cloud computing environment, computing resources including, for example, the hardware and software need to be set up or configured according to the needs of the users. Cloud configuration may be considered as the process of setting hardware and software details for components or elements of a cloud environment so that they can interoperate and communicate to meet the needs of the users commissioning the computing resources.

The complexities of a cloud environment make such configuration more challenging than would be the case in a single-location, homogenous network. For instance, the provider of the computing resources in the cloud environment has to enable service for users in various locations, using different hardware and software components. Further, the provider has to ensure that the service is reliable, performance is acceptable and communications are secure.

BRIEF SUMMARY

A method and system of generating configuration images and deploying computer components in a computing environment that comprises a shared pool of configurable computing resources may be provided. The method, in one aspect, may include automatically mining by one or more hardware processors repositories for configuration templates, the configuration templates comprising executable commands that configure computer hardware and software resources on the computing environment. The method may also include classifying by one or more of the hardware processors the configuration templates into classes of different service configurations. The method may further include creating base templates representing the different service configurations based on the configuration templates classified into classes of different service configurations. The method may also include receiving a deployment request with specified requirements for deploying computer resources for a requested service on the shared pool of configurable computing resources. The method may further include searching the configuration templates for configurations that meet the specified requirements for the requested service. The method may also include creating a plurality of candidate templates based on the base templates that represent configurations for the requested service and the configurations that meet the specified requirements. The method may further include selecting a target template from the plurality of candidate templates that most meets the specified requirements. The method may also include deploying the computer resources for the requested service by executing the target template.

A system of generating configuration images and deploying computer components in a computing environment that comprises a shared pool of configurable computing resources, in one aspect, may include one or more hardware processors operable to automatically mine repositories for configuration templates. The configuration templates may include executable commands that configure computer hardware and software resources on the computing environment. One or more of the hardware processors may be further operable to classify the configuration templates into classes of different service configurations. One or more of the hardware processors may be further operable to create base templates representing the different service configurations based on the configuration templates classified into classes of different service configurations. A storage device may be operable to store the base templates. One or more of the hardware processors may be further operable to receive a deployment request with specified requirements for deploying computer resources for a requested service on the shared pool of configurable computing resources. One or more of the hardware processors may be further operable to search the configuration templates for configurations that meet the specified requirements for the requested service. One or more of the hardware processors may be further operable to create a plurality of candidate templates based on the base templates that represent configurations for the requested service and the configurations that meet the specified requirements, the base templates augmented with additional configurations that address the specified requirements. One or more of the hardware processors may be further operable to select a target template from the plurality of candidate templates that meets the specified requirements with least risk impact. One or more of the hardware processors may be further operable to deploy the computer resources for the requested service by executing the target template.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3A shows an example of a configuration template in one embodiment of the present disclosure.

FIG. 3B shows another example of a configuration template in one embodiment of the present disclosure.

FIG. 4 shows a sample template that includes a supplement feature in one embodiment of the present disclosure.

DETAILED DESCRIPTION

Figure 1:
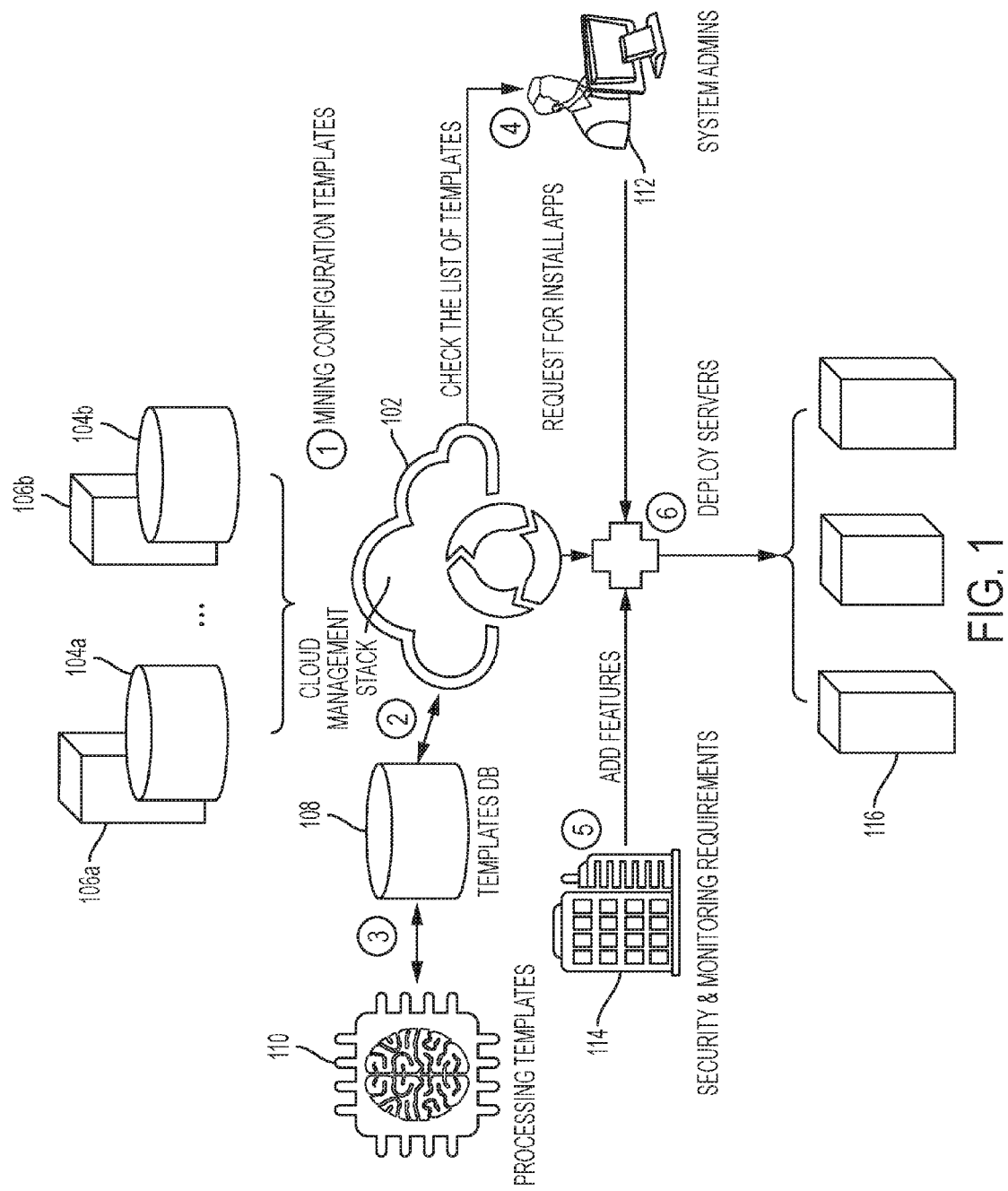
FIG. 1 is a diagram illustrating a system overview in one embodiment of the present disclosure.

A system, method and techniques may be provided for mining and/or validating build and/or configuration templates, and recommending an optimal configuration in a Cloud environment. For example, computing resources such as virtual machines (VMs) and applications may be configured and deployed in a Cloud environment. Configuration templates include predefined configurations that can be used to set up services of a cloud, a computing environment comprising a shared pool of configurable computing resources, for example, build an image. A configuration template may contain particular configuration details associated with a type of a computing infrastructure, operating systems, and middleware or application information such as those that host a web site (a web server), database server, application server, and/or others. Configuration templates may also include predefined security configuration, monitoring configuration, scaling group for load balancing and web services.

In one embodiment, configuration templates may be mined from public template repositories and validated. For instance, hub repositories or operating system distributions may have repositories that contain various configuration templates for configuring application and library components on a cloud computing environment. Similarly, private organizations may also have such repositories for in-house use only. In one embodiment, available and access permitted configuration repositories may be searched and mined for various configuration templates.

In one embodiment, base templates may be created that represent specific configurations based on the mined configuration templates. Additional configurations such as security, management, monitoring may be supplemented. A ready-made optimal configuration template may be recommended that can be directly applied to the target computer environment.

It is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The cloud computing paradigm may be different from other computing domains, for example, in that the cloud can be viewed to an extent as having infinite scalability. For instance, while in traditional projects managers are constrained by the number of resources to perform a task, in the cloud one can assign as many resources as one may want to perform a task. Releasing resources in the cloud can be instantaneous, which may not be the case with regular project management. With the cloud computing, one can start with a very small number of resources and grow as needed, paying only for what was used.

A system and/or method may be implemented, for example, in a hybrid cloud environment. An engine executing on one or more computer processors, or implemented as one or more computer processors, may be provided that mines and validates the configuration templates, learns the specifications and properties of configuration templates and recommends the optimal templates. The engine may be integrated with the cloud management stack to provision computing resources with specific configuration requests (e.g., middleware, application, hadoop or the like map-reduce clusters). In a hybrid cloud environment, each cloud may have its own infrastructure (e.g., container, hypervisor, bare metal, and/or others). Briefly, a hypervisor is an operating system that can provide a multi-tenant supported platform, hosting virtual machines. A bare metal for example may include a computer system and/or network environment in which a virtual machine may be installed directly on hardware rather than within a host operating system or a hypervisor. The system and/or method of the present disclosure, for example, integrated in cloud management stack may manage the new deployment of computing resources, for example, virtual machines with operating system, middleware, and applications.

The system and/or method of the present disclosure in one embodiment may automatically mine the public configuration templates and categorize and/or organize them in categories. Various configuration templates may be harmonized for different infrastructure platforms. The system and/or method in one embodiment may supplement additional features responsive to receiving the deployment requests or when the deployment requests are made. The system and/or method of the present disclosure in one embodiment may learn and/or suggest an optimal configuration. The automatic process performed by the system and/or method of the present disclosure in one embodiment allows for prompt processing such that users can get the servers in time, for example, provides for rapid service provisioning, time-to-value for service operations. In one aspect, the golden images may be at least partially replaced with configuration templates, saving the storage and enabling reconfigurability.

FIG. 1 is a diagram illustrating a system overview in one embodiment of the present disclosure. Cloud management stack 102 is a layer, e.g., a software layer, in the cloud that manages large clusters of machines, e.g., that facilitates the formation of cloud platforms and manages resources in the cloud, e.g., virtual machines. The cloud management stack 102 executing on one or more hardware processors may mine or search for configurations or configuration templates from available public repositories and/or accessible private repositories 104a, 104b, for example, provided by cloud service providers 106a, 106b or the like. FIGS. 3A and 3B illustrates examples of configuration templates that may be mined from different repositories.

The cloud management stack 102 in one embodiment of the present disclosure may generate a plurality of base templates for pre-defined classes of services, based on the mined configuration templates. For instance, component shown at 110 may process the configuration templates and generate base templates, which may be stored in a template database 108. For example, base templates may be created for deploying a web server; base templates may be created for deploying a virtual machine, base templates may be created for deploying a database server or application, base templates may be created for providing another cloud related service.

Responsive to a user 112, for example, a system administrator requesting deployment of a computing component, for example, a server or infrastructure in the cloud environment, templates stored in the template database 108 may be retrieved and additional configurations mined for configuring the user specified requirements. For instance, for adding additional features such as security features and monitoring features 114, additional configurations mined from the templates database 108 may be added to the base templates, to create proprietary templates customized for the user. From the multiple proprietary templates that are created, one that has the least risk impact, for example, that meets the user's specification requirement, is selected. FIG. 4 illustrates an example template that is created and which includes the user specified requirements such as monitoring features in addition to operating system, libraries, and applications. The selected template may be executed to deploy the components requested by the user to run in the cloud environment 116.

Figure 2:
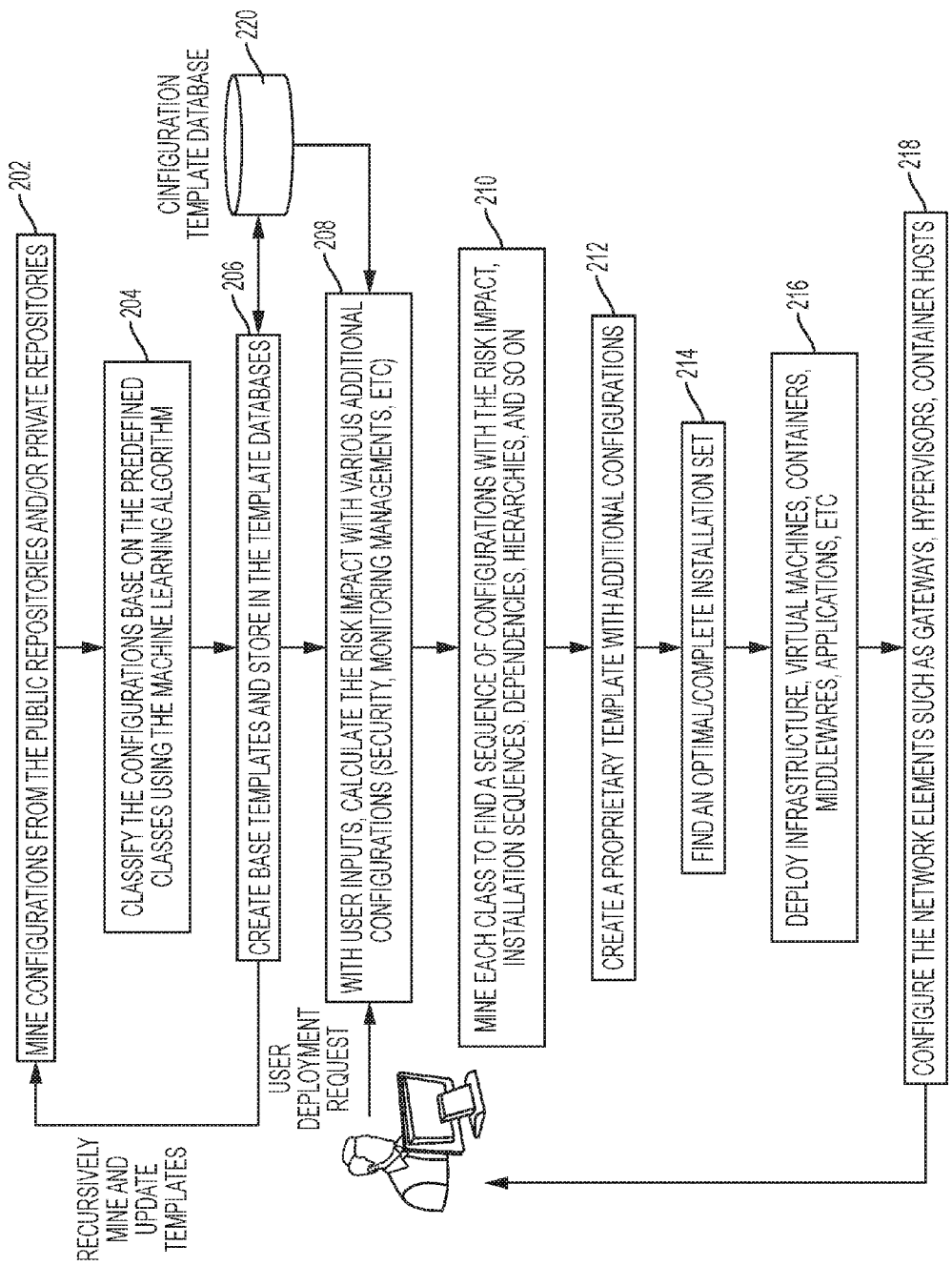
FIG. 2 is a diagram illustrating a method in one embodiment of the present disclosure.

FIG. 2 is a diagram illustrating a method in one embodiment of the present disclosure. At 202, configurations from available public repositories and/or accessible private repositories may be searched for and mined. For instance, providers of cloud services may make configuration templates available to users for configuring infrastructures, platforms, software, and applications in cloud environment. A configuration refers to an individual command that may deploy or configure a component in a cloud environment. A configuration template may include a plurality of such commands executable on a virtual or hardware processor.

At 204, the configuration templates mined from the repositories may be classified based on a plurality of predefined classes using a machine learning algorithm. Examples of predefined classes may include different services that can be provided by the cloud computing environment, for example, those for installing different types of infrastructure, different types of applications, different types of servers, e.g., for web service, game service, map service, and/or others. A service may include multiple middleware components (e.g., database, file system, memory cache) and applications (e.g., web application) that can provide a web service. Mined configuration templates thus may be classified according to the type of service the templates are configured to deploy or provide.

An example of a machine learning algorithm, which may implement the classification at 204, may include a Support Vector Machine (SVM)-based active learning algorithm. Other machine learning techniques may be employed.

Table 1 shows Support Vector Machine (SVM)-based active learning algorithm for multi-label classifier in one embodiment of the present disclosure. Briefly, an SVM is a discriminative classifier formally defined by a separating hyperplane. Given labeled training data (supervised learning), the algorithm outputs an optimal hyperplane which categorizes new examples.

Table 1
Inputs: Labeled set $D_l$, unlabled set $D_u$, number of steps T, number of examples per iteration S t=1;
while t<=T do
    Train a multi-label SVM classifier f based on training data $D_l$
    for each instance x in $D_u$ do
    Predict its label vector y using the LR (loss reduction)-based prediction method
        $D^*_s = \mathrm{argmax}_{Ds} (\Sigma_{X \in Ds} \Sigma_{i=1} ((1-y^i f_i(x))/2))$
        constrained to $y^i \in \{-1, 1\}$
        (equation for Maximum loss reduction with maximal confidence)

Calculate the expected loss reduction with the most confident label vector y,
   score(x)=$\Sigma^k_{i=1}((1-y^i f_i(x))/2)$
Sort score(x) in decreasing order for all x in $D_u$
Select a set of S examples $D^*_s$ with the largest scores (or experienced subject matter expert (SME) input),
   and update the training set $D_l \leftarrow D_l + D^*_s$
end for
Train the multi-label learner 1 with $D_l$
t=t+1;
end while
$f_i(x)$ is a SVM classifier associated with class i
$x_l \ldots x_n$ data points (e.g., feature vector for each x—[application, list of required libraries, supported operating systems, possible platforms, etc.])

At 206, one or more base templates may be created using the classified configuration templates. For instance, a base template for different types of deployment (e.g., web service deployment, database service deployment, another application deployment, and/or others) may be generated from the classified configuration templates and the configurations contained therein. The base templates may be stored in a storage device 210.

At 208, user deployment request may be received. The user deployment request may specify the type of deployment, and also additional requirements such as those related to security, monitoring, management and/or others. For instance, the user may specify that certain network configurations such that ports should be opened or not be opened for security reasons or that network address translation (NAT) needs to be set up for the assigned Internet Protocol (IP) address, require monitoring components that can capture certain logs or resource usages, and/or others.

In one embodiment, the user deployment request may be classified into one or more of the predefined classes, which classes, for example, have been used to classify the configuration templates. A base template, from the configuration template database 220, belonging to the class the user deployment request is classified is selected for this user deployment request.

For the selected base template, a risk impact may be computed. The risk impact identifies the compatibility among components in the template. For example, if the template contains components A, B, C, and for example, if their versions are known to be incompatible, the risk impact of this template may be set as having a high risk impact, so that installing components A, B, C together may be prevented. For example, the configuration template database 220 may store multiple base templates of the same class. A base template that has the least risk impact may be selected.

At 210, with the user specific requirements, each class may be mined to find a sequence of configurations in the classified templates that can satisfy the minimum risk impact and dependency requirements. For example, an installation sequence may need to be considered due to dependencies among components, and determining or assessing the risk impact of the configurations specified in the template can reduce the risk of errors.

Table 2 illustrates an example mining algorithm, a generalized sequential pattern algorithm, in one embodiment of the present disclosure for searching for a sequence of configurations. The mining algorithm outputs the sequences of configurations based on the factors (such as risk metrics, installation sequences, dependencies, hierarchies, etc.). A simple example includes that a web application framework's library components be installed before installing a web-application based on that framework, for example, a Django Python library should be installed before a Python-based web application is installed.

Table 2
Inputs: F1=the set of frequent 1-sequence; k=2
do while F(k−1)!=Null;
   Generate candidate sets Ck (set of candidate k-sequences);
   For all input sequences s in the database D
   do
      Increment count of all a in Ck if s supports a
      Fk={a∈Ck such that its frequency exceeds the threshold}
      k=k+1;
      Result=Set of all frequent sequences is the union of all Fks
   End do
End do
Outputs: Sequences of configurations based on the factors (such as risk metrics, installation sequences, dependencies, hierarchies, etc.)

At 212, a plurality of customized or proprietary candidate templates may be generated by adding a sequence of configurations mined at 210 to the base template. For example, this template becomes a proprietary template specifically used for the user with additional requirements. FIG. 4 shows an example of a complete proprietary template with additional features at the end. Multiple proprietary candidate templates may be generated, for example, by adding different sequences of configurations to the base template.

At 214, among all of the plurality of candidate templates generated at 212, an optimal installation template is selected. For instance, for each of the templates, a risk impact may be computed to determine which template best meets the requirements of the user.

An example method for determining a risk impact may utilize the risk function shown in Eq. (1):

$$R(\theta,\delta) = E_\theta L(\theta,\delta(X)) = \int_x L(\theta,\delta(X)) dP_\theta(X) \qquad \text{Eq. (1)}$$

In Eq. (1),
θ is a fixed (possibly unknown) state of nature;
X is a vector of observations stochastically drawn from a population (e.g., communication patterns of S1-S2-S3, criticality of each server, performance observer, impact on the overall application performance);
δ(X) is the expectation over all population values of X;
$dP_\theta$ is a probability measure over the event space of X, parameterized by θ; and
the integral is evaluated over the entire support of X.

In one embodiment, an optimal configuration template with minimum risk impact may be identified. In one embodiment, each configuration template is represented as an n-dimensional risk feature vectors, where n is the number of features. It can be verified if extracted risk features from one server remain relatively stable over multiple repetitions.

In one embodiment, given a new configuration sample, the score may be computed as follows. Suppose the new configuration's risk feature vector is $\underline{X} = \{X_1, X_2, X_3, \ldots X_i, \ldots X_n\}$, where i represents the $i^{th}$ feature. And, the existing configuration template vector $T = \{T_1, T_2, T_3, \ldots T_i, \ldots T_n\}$. The score is the accumulated deviation from the two vectors over all normalized features. The cost function may be defined as follows:

$$\text{Minimize } D(X,T) = \Sigma^n_{i=1} \|R(X_i - T_i)/\sigma_i\|,$$

constrained to $\sigma_i \in [0, 1]$,
where R is the risk impact, n is the number of configuration templates, and σ is a weighting coefficient.

Example

Configuration template (T1) contains [hypervisor, virtual machine, operating system, list of libraries]. Similarly, there may be configuration templates T2, T3, . . . Tn (templates in the same class), with different configurations.

Added security and monitoring features (X1) contains [operating system kernel security libraries or module, monitoring libraries], X2, X3, . . . represent additional features requested by users. Output: the optimal template with added features is Xk.

FIG. 3A shows an example of a configuration template. The template in this example contains configurations (e.g., instructions or commands) to be executed to a build server image, in this example, a web server or a web server image with Node.js web application. Similarly, FIG. 3B shows another example of a configuration template. In this example also, the template contains configurations or instructions for building a web server or web server image. FIGS. 3A and 3B render the same output, but target different platforms. They represent two different templates in the same class with different target environments. Briefly, an image may contain an operating system, libraries, and one or more applications, for example, a web application installed.

FIG. 4 shows a sample template that includes a supplement feature in one embodiment of the present disclosure. For instance, the template shows added monitoring feature that may meet the user specified requirement. The processing at 212 in FIG. 2, for example, may create the template shown in FIG. 4. Further, this example template may be selected as the one with minimum risk impact, for example, in processing shown at 214 in FIG. 2.

Referring to FIG. 2, at 216, deployment is performed by running or executing the template selected at 214. For instance, one or more of infrastructure, virtual machines, container, middlewares, and/or applications, may be deployed per user request.

At 218, additional system configurations may be performed. For example, network elements such as gateways, hypervisors, container hosts may be configured.

In one aspect, machines may be analyzed to identify the configurations installed in the system and to recommend the optimal configuration of found components. Individual machines may be monitored and configuration changes may be recommended according to the security and/or performance requirements. A method and/or system in one aspect may check the compatibility of system components that can be installed, and ensure integrity of the identified relationship of the components. A method and/or system in one aspect may provide for variable and/or dynamic configuration and additional risk assessment of computer components. A mechanism in one embodiment may be reactive in that the monitoring captures anomalies in a computer system.

Figure 5:
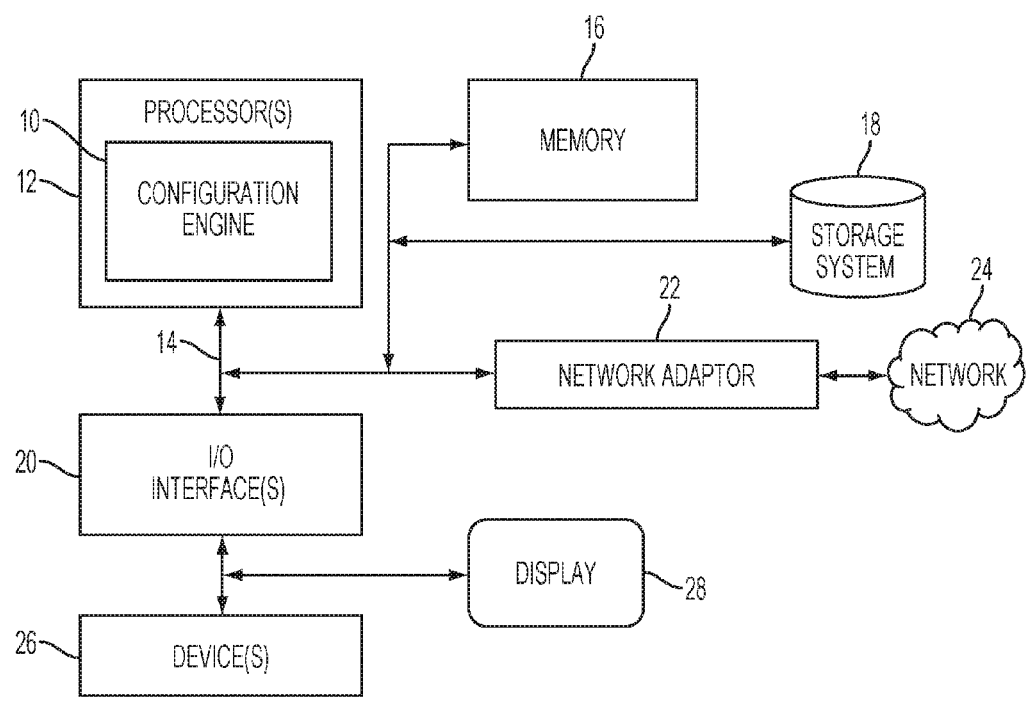
FIG. 5 illustrates a schematic of an example computer or processing system that may implement an automatic configuration and/or deployment system in one embodiment of the present disclosure.

FIG. 5 illustrates a schematic of an example computer or processing system that may implement an automatic configuration and deployment system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a configuration and/or deployment module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive").

Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of generating configuration images and deploying computer components in a computing environment that comprises a shared pool of configurable computing resources, comprising:
   automatically mining by one or more hardware processors repositories for configuration templates, the configuration templates comprising executable commands that configure computer hardware and software resources on the computing environment;
   classifying by one or more of the hardware processors the configuration templates into classes of different service configurations;
   creating base templates representing the different service configurations based on the configuration templates classified into classes of different service configurations;
   receiving a deployment request with specified requirements for deploying computer resources for a requested service on the shared pool of configurable computing resources;
   searching the configuration templates for configurations that meet the specified requirements for the requested service;
   creating a plurality of candidate templates based on the base templates that represent configurations for the requested service and the configurations that meet the specified requirements;
   selecting a target template from the plurality of candidate templates that most meets the specified requirements; and
   deploying the computer resources for the requested service by executing the target template.

2. The method of claim 1, further comprising configuring one or more network elements responsive to the deploying.

3. The method of claim 1, wherein the target template is selected based on determining risk impacts associated with the plurality of candidate templates.

4. The method of claim 1, wherein the different service configurations comprises configurations for a web server, database server, application server, virtual machine, a computing infrastructure, a computing platform, a middleware.

5. The method of claim 1, wherein a support vector machine is implemented for the classifying.

6. The method of claim 1, wherein the candidate templates augment the base templates with additional configurations that address the specified requirements.

7. The method of claim 1, further comprising storing the base templates in a storage device.

8. The method of claim 1, wherein the mining, the classifying and creating the base templates are performed iteratively to generate updated set of base templates.

9. A system of generating configuration images and deploying computer components in a computing environment that comprises a shared pool of configurable computing resources, comprising:
   one or more hardware processors operable to automatically mine repositories for configuration templates, the configuration templates comprising executable commands that configure computer hardware and software resources on the computing environment,
   one or more of the hardware processors further operable to classify the configuration templates into classes of different service configurations,
   one or more of the hardware processors further operable to create base templates representing the different service configurations based on the configuration templates classified into classes of different service configurations;
   a storage device operable to store the base templates,
   one or more of the hardware processors further operable to receive a deployment request with specified requirements for deploying computer resources for a requested service on the shared pool of configurable computing resources,
   one or more of the hardware processors further operable to search the configuration templates for configurations that meet the specified requirements for the requested service,
   one or more of the hardware processors further operable to create a plurality of candidate templates based on the base templates that represent configurations for the requested service and the configurations that meet the specified requirements, the base templates augmented with additional configurations that address the specified requirements,
   one or more of the hardware processors further operable to select a target template from the plurality of candidate templates that meets the specified requirements with least risk impact,
   one or more of the hardware processors further operable to deploy the computer resources for the requested service by executing the target template.

10. The system of claim 9, wherein one or more of the hardware processors are further operable to configure one or more network elements.

11. The system of claim 9, wherein the different service configurations comprises configurations for a web server, database server, application server, virtual machine, a computing infrastructure, a computing platform, a middleware.

12. The system of claim 9, wherein one or more of the hardware processors implements a support vector machine for classifying the configuration templates.

13. The system of claim 9, wherein the candidate templates augment the base templates with additional configurations that address the specified requirements.

14. The system of claim 9, wherein one or more of the hardware processors iteratively mine, classify and create the base to generate updated set of base templates.

15. A computer readable storage device storing a program of instructions executable by a machine to perform a method of generating configuration images and deploying computer components in a computing environment that comprises a shared pool of configurable computing resources, the method comprising:

automatically mining by one or more hardware processors repositories for configuration templates, the configuration templates comprising executable commands that configure computer hardware and software resources on the computing environment;

classifying by one or more of the hardware processors the configuration templates into classes of different service configurations;

creating base templates representing the different service configurations based on the configuration templates classified into classes of different service configurations;

receiving a deployment request with specified requirements for deploying computer resources for a requested service on the shared pool of configurable computing resources;

searching the configuration templates for configurations that meet the specified requirements for the requested service;

creating a plurality of candidate templates based on the base templates that represent configurations for the requested service and the configurations that meet the specified requirements;

selecting a target template from the plurality of candidate templates that most meets the specified requirements; and deploying the computer resources for the requested service by executing the target template.

16. The computer readable storage device of claim 15, further comprising configuring one or more network elements responsive to the deploying.

17. The computer readable storage device of claim 15, wherein the target template is selected based on determining risk impacts associated with the plurality of candidate templates.

18. The computer readable storage device of claim 15, wherein the different service configurations comprises configurations for a web server, database server, application server, virtual machine, a computing infrastructure, a computing platform, a middleware.

19. The computer readable storage device of claim 15, wherein a support vector machine is implemented for the classifying.

20. The computer readable storage device of claim 15, wherein the candidate templates augment the base templates with additional configurations that address the specified requirements.

\* \* \* \* \*